April 4, 1944.  M. A. WECKERLY  2,346,122
PACKAGE CHECKING DEVICE
Filed Nov. 21, 1941   3 Sheets-Sheet 1
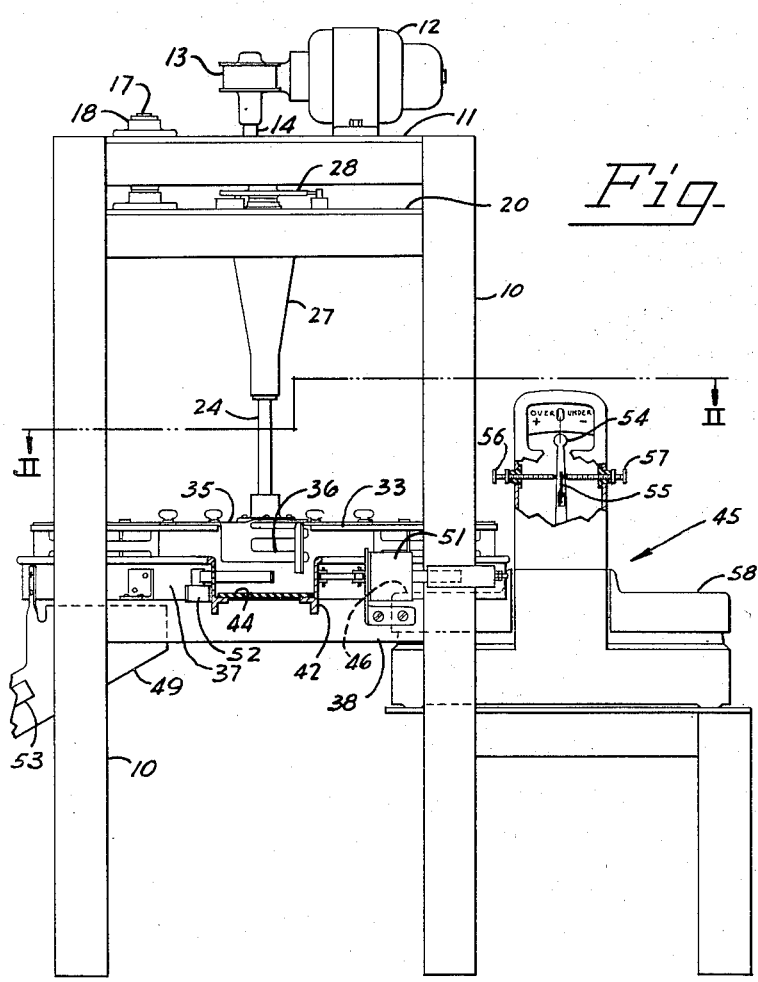
Fig. I
Mark A. Weckerly
INVENTOR
BY Marshall & Marshall
ATTORNEYS

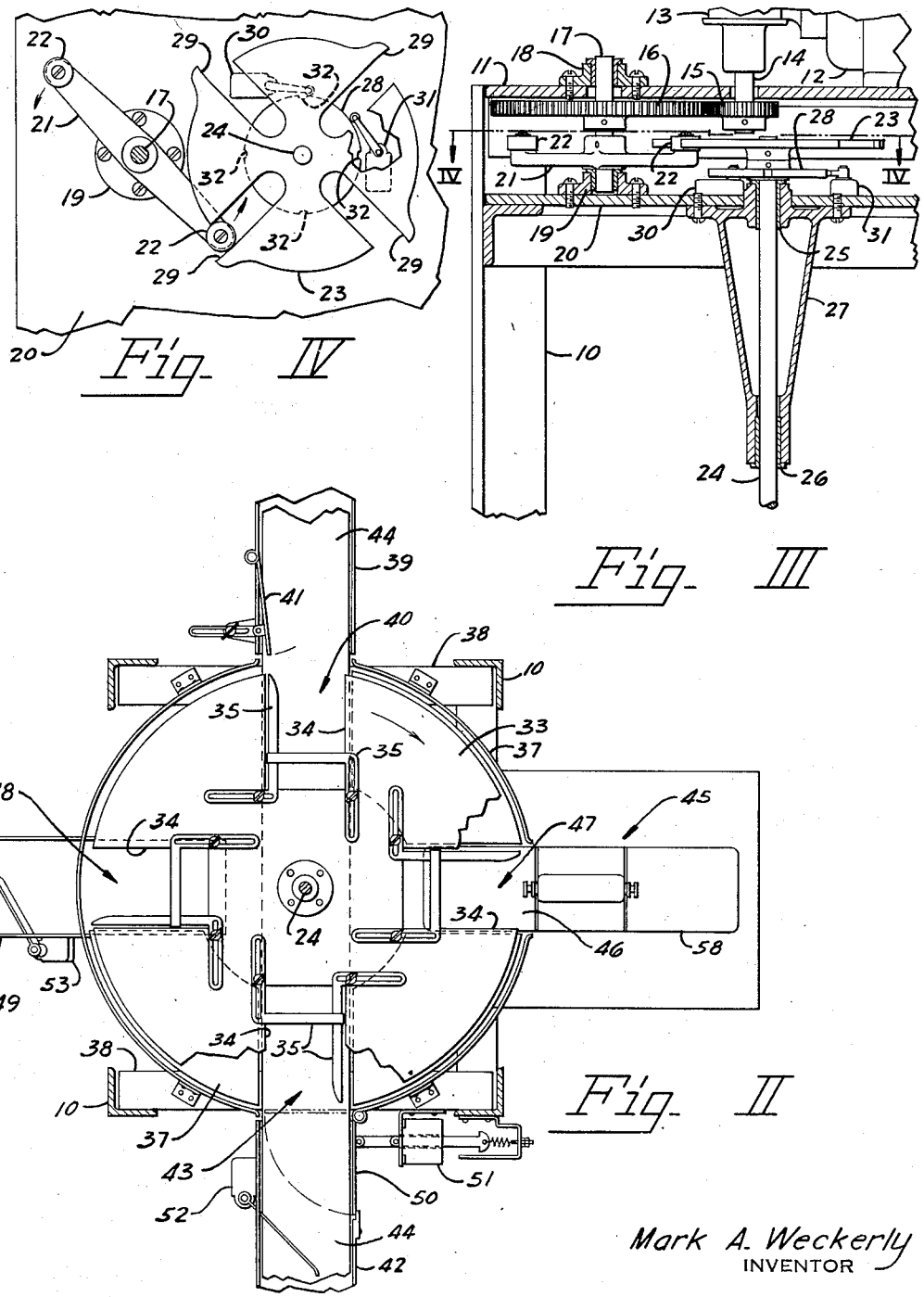

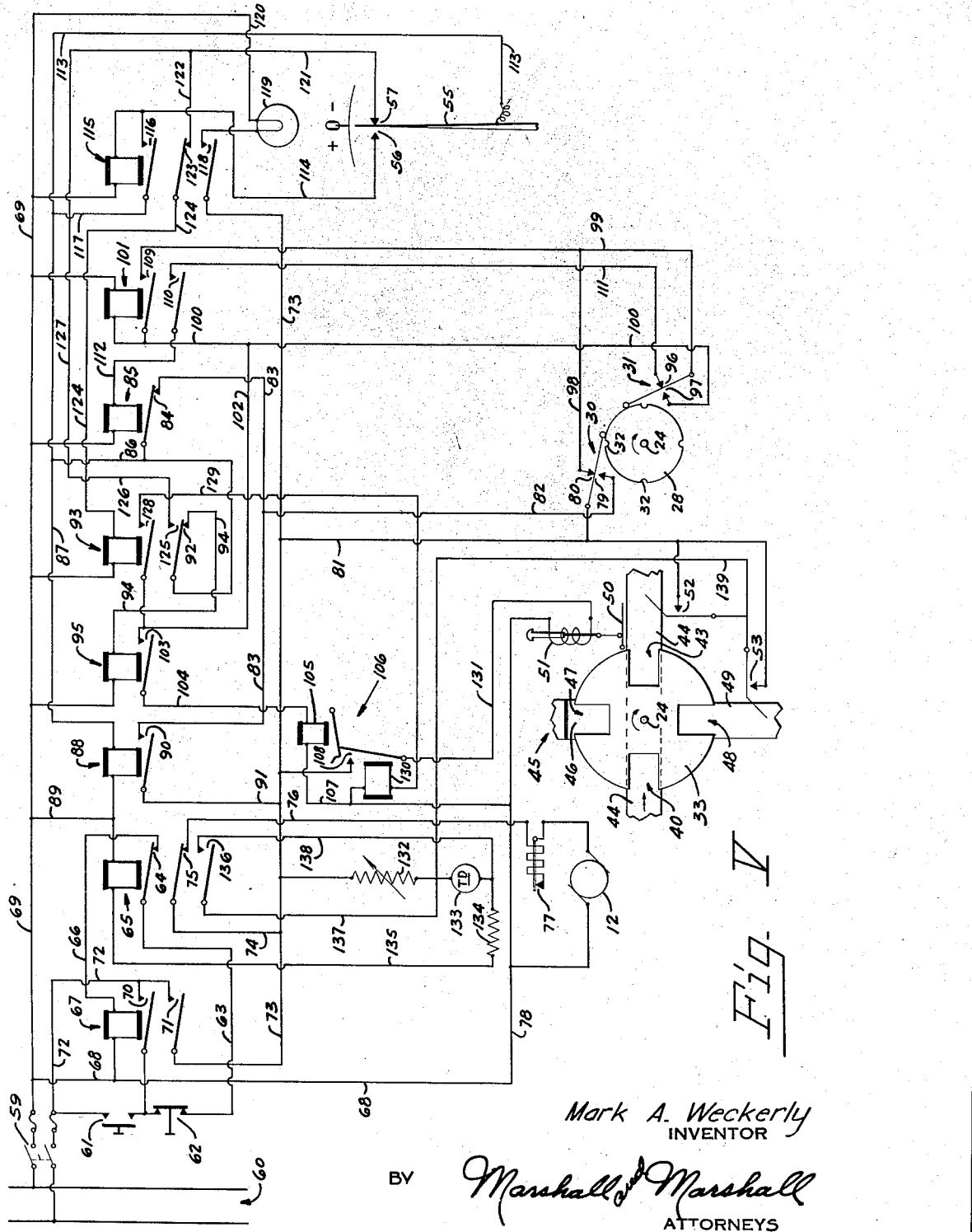
Fig. V

Patented Apr. 4, 1944

2,346,122

UNITED STATES PATENT OFFICE 2,346,122

PACKAGE CHECKING DEVICE

Mark A. Weckerly, Toledo, Ohio, assignor to Toledo Scale Company, Toledo, Ohio, a corporation of New Jersey Application November 21, 1941, Serial No. 419,905

2 Claims. (Cl. 209—121)

This invention relates to package checking devices of the type which check the weight of packaged goods and automatically reject such packages as may fall outside pre-established weight tolerances.

In many industries, particularly in such industries as baking, cracker manufacturing, cereal preparing and other food preparing businesses, standard sized packages have certain pre-established net weights. In such industries, not only because of legal restrictions enforcing the giving of full measure but also because of the necessity for retaining consumers good will, it is highly important that the contents of each and every package be at least that which is specified on the package label. Various systems for assuring full weight are in use, among them being batteries of scales, one located near each packer on which the packer may check the weight of the package, and rotary tables having a plurality of scales mounted on the table which rotate with it and on each of which an individual package may be weighed. The first mentioned system is, of course, rather slow and has a further disadvantage, in common with the second mentioned system, in that several weighing scales are necessary to perform the checking operation.

It is an object of this invention to provide a package weighing device which will automatically weigh each package being carried by a conveying belt away from the location of the packers.

It is another object of this invention to provide a package weighing device which will positively reject such packages as may fall outside pre-established weight tolerances.

It is a further object of this invention to provide a package checking device which will check the weight of each package, automatically reject it if outside pre-established weight tolerances or permit it to continue on to the next step in the packaging process if within the pre-established tolerance.

It is still another object of this invention to provide a package checking device which is adjustable for different size packages the weight of which it is desirable to check.

It is yet another object of this invention to provide a package checking device which will automatically weigh packages to a pre-established tolerance and which will automatically cease operation in the event that means of egress from the device for the checked packages are blocked.

It is a still further object of this invention to provide a package checking device which will reject under-weight packages and give positive notification of over-weight packages.

More specific objects and advantages are apparent from the description, in which reference is had to the accompanying drawings illustrating a preferred form of scale embodying the invention.

In the drawings:

Fig. I is a view in elevation of a package checking device embodying the invention, certain parts being shown in section and certain parts being broken away.

Fig. II is a plan view of the device shown in Fig. I, taken substantially from the position indicated by the line II—II of Fig. I.

Fig. III is a fragmentary vertical sectional view of the motivating portion of the device illustrated in Fig. I.

Fig. IV is a fragmentary plan view, taken substantially from the position indicated by the line IV—IV of Fig. III.

Fig. V is a schematic wiring diagram of an electrical circuit for the operation of that embodiment of the invention illustrated in Fig. I.

These specific drawings and the specific description that follows merely disclose and illustrate the invention and are not intended to impose limitations upon the claims.

A main frame 10 supports a shelf 11 which is located at the upper end of the frame members. An electric motor 12 is located on the shelf 11 and drives, through a right angle gear box 13, a vertical shaft 14 on the lower end of which (Fig. III) there is pinned a pinion gear 15. The pinion gear 15 is in mesh with a large gear 16, which is pinned on a vertically extending jackshaft 17 journaled in a bearing 18 fastened to the shelf 11, and a bearing 19 supported by a second shelf 20 which is also supported on the frame 10. Also pinned on the shaft 17 is a horizontally rotatable driving arm 21 which is driven in a counterclockwise direction (Fig. IV). The driving arm 21 has two oppositely extending ends, on each of which there is mounted a horizontally rotatable roller 22.

A four-slot Geneva gear 23 is pinned on the upper end of a vertically disposed shaft 24, which is journaled in bearings 25 and 26 located in the upper and lower ends respectively of a sleeve-like member 27 supported by the shelf 20. A four-position contact disk 28 is also pinned on the shaft 24 and located immediately below the Geneva gear 23. The horizontal spacial relation between the shafts 17 and 24 is such that one complete rotation of the shaft 17 and of the driving arm 21 will cause each of the rollers 22 to be engaged, one at a time, with one of the slots in the Geneva gear 23 and the engagement of each roller in one of the slots will turn the Geneva gear one-fourth of a turn; in other words, the gearing between the shafts 17 and 24 is in mesh for a quarter of a turn of the shaft 17, out of mesh for the following quarter turn and in mesh for the successive quarter turn, etc. The slots of the Geneva gear 23 are constructed with parallel side walls and the distance between these side walls is just slightly more than the diameter of the roller 22. The trailing side of each of the slots is extended outwardly from the center of the Geneva gear in the form of a curved ear 29. The curvature on the edge of the ear 29 is opposed to the line of movement of the roller 22 and thus, after the Geneva gear 23 has been turned a full quarter turn by the engagement of one of the rollers 22 in one of the slots, the gear is backed up slightly by the engagement of the roller 22 with that surface 29 of the slot which the roller has just left.

Two switches 30 and 31 have their arms engaged against the edge of the contact disk 28, in the peripheral surface of which there are cut four notches 32 which are equally spaced at ninety degrees from each other and which are so located that the arm of the switch 30 is engaged in one of the notches 32 just after the driving arm 21 has started to move the Geneva gear 23 and the shaft 24.

Fastened to the lower end of the shaft 24 is a horizontally disposed circular tray 33 in which there are four openings 34, the size of which may be varied by setting adjustable clamps 35 which have downwardly extending grills 36 (Fig. I) attached to them. The openings 34 in the tray 33 are spaced at ninety degrees around the tray and correspond to the four slots in the Geneva gear 23 and the four notches 32 in the contact disk 28.

A horizontal pan-shaped table 37 is supported on cross arms 38 attached to the frame 10 immediately beneath and concentric with the rotating tray 33. The table 37 has four openings which are in registration with the openings 34 in the tray 33 when the tray 33 is in the rest position assumed between engagements of the driving arm 21 and the Geneva gear 23. The side wall of the circular table 37 is open at three of the four positions. A trough 39 leads up to an opening 40 in the side wall and bottom of the table 37. A portion 41 of the wall of the trough 39 is adjustable to vary the width of the trough 39 in accordance with the position of the brackets 35. A second trough 42 leads away from an opening 43 diametrically opposed to the opening 40 to which the trough 39 leads. A conveyer belt 44 moves along the bottom of the troughs 39 and 42 and forms the bottom surface of those two of the openings 34 in the tray 33 which are positioned above the openings 40 and 43 at any particular time. The conveyer belt 44 is on the same horizontal level as the bottom of the pan-like table 37.

An "over and under" scale 45 is positioned so that its load receiving platter 46 forms the bottom of an opening 47 in the table 37 which is located between the troughs 39 and 42 to the right of the conveyer belt 44 (Fig. II). The remaining opening 48 in the table 37 is positioned immediately above a chute 49 which leads to the reject box (not shown). The side wall of the table 37 does not have an opening in it in this position.

A gate 50 forms a portion of the wall of the trough 42 and is adapted to be swung across the opening 43 in the side wall of the table 37 by the core rod of a gate energizing solenoid 51 to which the gate 50 is attached. The solenoid 51 is mounted on one of the cross arms 38. A switch 52 has its actuating arm extending into the trough 42 and is closed momentarily each time a package passes through the trough 42. A similar switch 53 is similarly mounted in the chute 49.

An indicator 54 of the scale 45 (Fig. I) carries a contact vane 55. Two contacts 56 and 57 are located in the path of movement of the vane 55 and may be adjusted to limit the amount of free movement of the vane 55, between the contacts 56 and 57, to establish and vary the amount of tolerance to be allowed over and under the pre-established standard weight for the packages to be checked on the device. The scale 45 has a second platter 58 on which weights, corresponding to the standard weight of the contents of the packages being checked, are placed.

Rotation of the shaft 17 and the driving arm 21 intermittently engages one of the rollers 22 in the slots of the Geneva gear 23 giving the shaft 24 a ninety degree rotation each time the arm 21 and gear 23 are so engaged. This rotates the tray 33 ninety degrees for each such engagement and packages being fed on the belt 44, down the trough 39, individually enter one of the openings 34 and are moved from their position on the belt 44 to position on the platter 46 of the scale 45 during one such engagement and during a subsequent engagement are moved again to a position over the opening 43 in the table 37 where they are once again on the belt 44 and are carried away through the trough 42.

Operation

Referring now to Figure V. After the desired master weight of the packages to be tested has been established, by placing weights on the platter 58 of the scale 45, and the over and under tolerances have been set by adjustment of the contacts 56 and 57, a master switch 59 is closed to carry current from a source 60 into the device. A normally open push button 61 is closed and current flows through the push button 61, a normally closed push button 62, a lead 63, a normally closed contact 64 of a relay 65, a lead 66, the energizing coil of a relay 67 and a lead 68 to a power lead 69 to the other side of the line. This energizes the relay 67 and closes two normally open contacts 70 and 71 of this relay. Closing of the contact 70 establishes a shunt around the push button 61 and current flows from one side of the line through a lead 72, the contact 70 to the push button 62 and through the lead 63, contact 64, lead 66, coil of the relay 67 and lead 68 to the power lead 69 "sealing in" the coil of the relay 67 and thus permitting the push button 61 to be released. The closing of the contact 71 permits current to flow through the lead 72 and the contact 71, a lead 73, a lead 74, a normally closed contact 75 of the relay 65, a lead 76 and an overload protection resistance 77 to the motor 12 and then through a lead 78 and the lead 68 to the lead 69 and the opposite side of the main power line 60. The motor 12 is thus energized and rotates the shaft 14, the pinion 15, the gear 16, the shaft 17 and the driving arm 21 which engages a slot in the Geneva gear 23 and rotates the shaft 24 and tray 33 (in a clockwise direction Fig. II) moving the package which has been carried into the opening 34 one-quarter of a turn and onto the load receiving platter 46 of the scale 45 and then backing up the tray 33, because of the momentary engagement between the roller 22 and the ear 29 of the Geneva gear 23, to free the package from the grill 36 which pushed it onto the platter 46. The package remains on the platter 46 during the subsequent quarter rotation of the shaft 17 (during which time neither of the rollers 22 are engaged in any of the slots in the Geneva gear 23) and, depending upon its weight, either engages the vane 55 with one of the contacts 56 and 57, or if it is within the tolerance the scale remains at balance and neither of the contacts is engaged.

If we assume that the first package weighed is within the specified tolerance, neither of the contacts is engaged and further rotation of the shaft 17 once again engages the Geneva gear 23 and rotates the tray 33. The contact disk 28 is also rotated and, almost as soon as the shaft 24 begins to turn, the arm of the switch 30 drops into one of the notches 32 (Fig. V) and closes its normally open contact 79 and opens its normally closed contact 80. Upon the closing of the contact 79, current flows from one side of the line, through the lead 72, contact 71, the lead 73, a lead 81, the contact 79, a lead 82, a lead 83, a normally closed contact 84 of a relay 85, a lead 86 and a lead 87, the energizing coil of a relay 88 and a lead 89 to the power lead 69. Energization of the relay 88 closes a normally open contact 90 and shunts out the contact 79 permitting current to flow directly from the lead 73, through a lead 91, the contact 90 to the lead 83. This "seals in" the relay 88 and thus the immediate opening of the contact 79 does not de-energize the relay 88 and current continues to flow through the circuit comprising the lead 72, contact 71, lead 73, lead 91, contact 90 of the relay 88, lead 83, contact 84, lead 86, a normally closed contact 92 of a relay 93, a lead 94, the energizing coil of a relay 95 and the power lead 69. Thus the relays 88 and 95, which were momentarily energized by the closing of the contact 79, are held energized by the "sealing in" action of the contact 90 of the relay 88.

The shaft 24 continues to turn, further rotating the tray 33 and contact disk 28 and just before the package being carried from the scale to the outgoing belt reaches the outgoing belt, the roller on the arm of the switch 31 falls into that one of the notches 32 which has just operated the switch 30. This opens its normally closed contact 96 and closes its normally open contact 97. Current now flows from one side of the line, through the lead 72, the contact 71, the lead 73, the lead 81, the contact 80 of the switch 30, a lead 98, a lead 99, the contact 97 of the switch 31 and a lead 100, through the energizing coils of a relay 101 to the power lead 69 and the opposite side of the line. Current also flows through the circuit just described and from the contact 97 and lead 100, through a lead 102, a contact 103 of the relay 95 which was closed upon energization of the relay 95 as above described, a lead 104, through an energizing coil 105 of an electrically operated mechanical latch relay 106, a lead 107, the lead 78, the lead 68 and the power lead 69 to the opposite side of the line. Energization of the coil 105 closes the releasing latch of the relay 106 to make certain that a gate contact 108 of that relay which controls the energization of the solenoid 51 and the operation of the gate 50 is open and thus guarantees that the opening 43 will not be closed when the package just weighed reaches the moving belt 44. The momentary closure of the contact 97 and the momentary energization of the relay 101 closes its normally open contacts 109 and 110. Closing of the contact 109 shunts out the circuit momentarily established by the closing of the contact 97 and "seals in" the relay 101 which was energized by such momentary closing. Current flows from one side of the line through the lead 72, contact 71, the lead 73, the lead 81, the contact 80, the lead 98, the lead 99, the contact 109 and the coil of the relay 101 to the power lead 69 and the opposite side of the line. Closing of the contact 110 permits current to flow through the circuit just described to the lead 99, then through the contact 96, a lead 111, the contact 110, a lead 112, the coil of the relay 85 and the power lead 69 to the opposite side of the line. This energizes the coil of the relay 85 and opens its normally closed contact 84 which breaks the circuit of the lead 72, the contact 71, the lead 73, the lead 91, the contact 90, the lead 83, the contact 84 (now open), the lead 86, the lead 87, the coil of the relay 88 and the lead 89 to the power lead 69 and the opposite side of the line. De-energization of the coil of the relay 88 permits its contact 90 to open and thus breaks the circuit just described at the contact 90. The opening of the contact 84 also de-energizes the coil of the relay 95, which was connected into the circuit just described, through the contact 84, the lead 86, the contact 92, the lead 94, the coil of the relay 95 and the power lead 69. De-energization of the coil of the relay 95 permits its contact 103 to open which de-energizes the coil 105 of the latch relay 106. This de-energization of the coil 105 does not affect the position of the latch relay 106 because it has been open (the contact 108 also has been open) all during the energization of the coil 105.

At this point the following circuits still exist. Current is still flowing through the lead 72, contact 71, the lead 73 and from this lead in one branch through the lead 74, the contact 75, the lead 76, the overload protection resistance 77, the motor 12, the lead 78 and the lead 68 to the power lead 69. Current also flows in a second branch from the lead 73, through the lead 81, the contact 80, the lead 98, the lead 99, the contact 109 and the coil of the relay 101 to the lead 69. Current also is flowing from the branch just described through the lead 99, the contact 96, the lead 111, the contact 110, the lead 112 and the coil of the relay 85 to the power lead 69.

Thus the motor 12 continues to turn and the next package is fed into weighing position on the platform 46 of the scale 45. During this time, the normally closed contact 84 of the relay 85 being held open, no current enters that branch of the circuit controlled by this contact. The package reaches the scale platform and is deposited thereon, is weighed, and, let us assume, is heavier than the pre-established weight tolerance. In the embodiment of the invention disclosed herein the control circuit is so designed that packages heavier than the established tolerances will not be rejected and will be permitted to continue along with the packages falling within the tolerance but will operate a warning light to notify the packers that an overweight package has been weighed. The mechanism is designed this way because the experience of food packaging companies in particular has been that the slight extra cost of the overweight portion of the contents of one package is much smaller than the additional labor cost required to remove the overweight package from the regular stream of packages and remove a sufficient percentage of its contents to bring it down within the tolerance.

In addition, overweight packages do not cause loss of consumers good will and are not contrary to laws and regulations governing the agreement between net weight printed on the outside of the package and weight of the contents.

Thus when the package is heavier than the established tolerances the contact 56 is closed prior to the operation of the switch 30. When the switch 30 is operated at the start of the next ninety degree rotation of the tray 33 the contact 80 is opened thus de-energizing the relays 85 and 101 (by breaking the circuits listed above which were still closed at the end of the last ninety degree cycle) and closing the contact 79 which permits current to flow through the normally closed contact 84 of the relay 85 and "seals in" the relay 88 through closure of its contact 90. Current then flows through the circuit first described (energizing the relays 88 and 95) and, in addition, through the lead 86, the lead 87, a lead 113, the contact 56, a lead 114, the energizing coil of a relay 115 and the power lead 69 to the opposite side of the line. This closes a normally open contact 116 of the relay 115 which shunts out the contact 56 by permitting current to flow through a lead 117 from the lead 87 and the coil of the relay 115 to the power lead 69, "sealing in" the relay 115. A normally open contact 118 of the relay 115 is also closed which permits current to flow from the lead 73 connected to one side of the line, through the contact 118, a warning lamp 119 and a lead 120 to the power lead 69 and the opposite side of the line. The lamp 119 serves to notify the packers that an overweight package has just been weighed.

In all other respects the operation of the device for an overweight package is identical with the operation of the device already described for a correct weight package and the motor continues to turn, rotating the tray 33, placing the package on the outgoing belt, the gate 50 being held upon as already described during this ninety degree operating cycle. The cycle comes to an end in the identical manner already described, leaving the same circuits connected through the contact 80 that have already been described as being connected at the end of the ninety degree cycle.

The motor continues to turn and feeds a third package onto the weighing scale backing up the feeding tray to remove it from contact with the package. If we assume that this third package is underweight, the contact 57 will be closed by the scale before the closing of the contact 79 of the switch 30 which takes place upon commencement of the subsequent ninety degree cycle. In this event, when the switch 30 is operated, the contact 80 is opened de-energizing the relays 85 and 101 as above described, and the contact 79 is closed establishing a circuit through the contact 84 of the relay 85, and energizing the relay 88 to "seal in" such circuit. In addition, the contact 57 being closed, current flows from the contact 84, through the lead 86, the lead 87, the lead 113, the contact 57, a lead 121, a lead 122, a normally closed contact 123 of the relay 115, a lead 124 and the coil of the relay 93 to the power lead 69 and the opposite side of the line. Energization of the relay 93 closes its normally open contact 125 which shunts out the contact 57 by connecting the contact 84, through the lead 86, to the contact 125, a lead 126, a lead 127, the lead 122, the contact 123 and the lead 124, through the coil of the relay 93 to the power lead 69 and to the opposite side of the line. This "seals in" the relay 93 so that it remains energized after the package leaves the scale platform and the contact 57 opens. Energization of the relay 93 also opens its normally closed contact 92 which controls the energization of the coil of the relay 95 and prevents such energization as long as the relay 93 is energized. In addition, a normally open contact 128 of the relay 93 is also closed. The contact 80 now closes and subsequent closure of the contact 97 of the switch 31 energizes and "seals in" the relay 101 and as soon as the contact 128 of the relay 93 is closed current flows from the lead 73, through the lead 81, the contact 80 and momentarily through the leads 98 and 99, contact 97 and lead 100 to energize the relay 101 and then through the lead 98, lead 99, contact 109 and coil of the relay 101 to "seal in" this relay and this portion of the circuit. Current also flows from the contact 109, through the lead 100, the lead 102, does not flow through the contact 103 to energize the coil 105 of the relay 106, but does flow through the contact 128, a lead 129 and a latch-close coil 130 of the latch relay 106 to the lead 107 and then through the lead 78 and the lead 68 to the power lead 69. Energization of the coil 130 of the latch relay 106 closes the latch relay and the contact 108 and current flows from the lead 73, through the contact 108, a lead 131, the coil of the solenoid 51, the lead 78 and the lead 68 to the power lead 69 and the opposite side of the line. The contact 108 is now mechanically locked shut and will continue to feed current through the solenoid 51 even though the coil 130 may subsequently become de-energized. The solenoid 51 extends its core rod and closes the gate 50 across the opening 43 in the wall of the pan-shaped table 37. The light package therefore is not carried away by the outgoing section of the belt 44 but remains back of the gate 50 until the subsequent 90 degree cycle of the tray 33 moves it around to the opening 48, through which it drops to slide down the chute 49 after which its deficiency may be corrected to bring it up to the standard weight.

The cycles just described for a correct weight package, a heavy weight package and a light weight package continue automatically varying with the weight of the packages being checked as long as the mechanism is energized through the master switches. Each of the packages at the time of its weighing may fall within the tolerance or, if it falls outside the tolerance may set up either of the switches 56 or 57 and that one of these two switches which is closed determines the subsequent operation of the mechanically locked electrically operating latch relay 106 which operates the gate 50 to permit packages to have egress from the table or to hold them on the table so they will be rejected.

If it is not desirable that the heavier than standard packages be carried away with the correct weight packages, the circuit may easily be changed to cause the overweight packages to operate the gate 50 in the same manner that the underweight packages now operate it; or, a second gate and a second chute, similar to the chute 47, may be provided for the overweight packages so that if both are rejected the underweight packages may be segregated from the overweight packages.

The device may be stopped at any time by opening the normally closed push button 62 which breaks the circuit flowing from one side of the power line, through the lead 72, the contact 70 of the relay 67, the push button 62, the lead 63, the normally closed contact 64 of the relay 65, the lead 66 and the coil of the relay 67, the lead 68 and the power lead 69 to the opposite side of the line. If this circuit is broken, the relay 67 is de-energized which permits the contact 71 to open and cuts off current flowing through the lead 72, the contact 71 and the lead 73 and from thence through the rest of the wiring circuit.

In addition, there are provided two automatic cut-off switches. These are the switches 52 and 53 which have already been described and are located in the trough 42 and chute 49 respectively. A variable resistance 132 is connected between the lead 73 and one side of a time delay 133. The opposite side of the time delay is connected through a resistance 134 and a lead 135 to the coil of the relay 65, and then through the lead 89 to the power lead 69 and the opposite side of the line. The resistance 132 may be varied to keep the time delay "warmer" or "cooler" as is desired. A normally open contact 136 of the relay 65 is connected by a lead 137 to the common connection between the variable resistance 132 and the time delay 133 and by a lead 138 to the common connection between the time delay 133 and the resistance 134 and thus if the contact 136 is closed it shunts out the time delay 133. The switches 52 and 53 have a common side which is connected through a lead 139 to the common connection between the variable resistance 132 and the time delay 133. The opposite sides of both of these switches are connected to the lead 81 and thence to the lead 73.

The time delay 133 operates in this manner. Each package which passes through the trough 42 or down the chute 47 momentarily closes either the switch 52 or the switch 53. This momentary closing either of these switches permits a small amount of current to enter the time delay but it does not flow through the time delay for a sufficient length of time to cause the time delay to close and energize the coil of the relay 65. However, if packages being carried away on the belt 44 jam in the trough 42, the switch 52 will be held closed a long enough period of time so that the time delay will close and current will flow from the lead 73, through the lead 81, the switch 52, the lead 139, the time delay 133, the resistance 134, the lead 135, the coil of the relay 65 and the lead 89 to the power lead 69 and the opposite side of the line. Energization of the relay 65 will close the normally open contact 136 which will "seal in" the relay 65 by shunting out the time delay and also open the contacts 64 and 75. The contact 75, being in series with the motor, de-energizes the motor when it opens and immediately stops the operation of the mechanical portion of the device. Similarly, the contact 64 being in series with the push button switches 61 and 62, when the contact 64 is opened the relay 67 is also opened and the device will not be operative again until after the jammed packages have been removed from the trough 42 and the starting push button 61 has again been momentarily closed. If packages jam in the chute 49, the switch 53 being parallel to the switch 52, the same result will occur.

The embodiment of the invention that has been disclosed may be modified to meet various requirements.

Having described the invention, I claim:

1. In a device of the class described, in combination, a package conveyor, a rotatable package handler, a weighing scale, range of tolerance establishing and detecting means connected to said weighing scale, mechanism for imparting intermittent movement to said package handler, said package handler moving one package from said conveyor onto said scale during one of such intermittent movements and moving such package from said weighing scale to said conveyor during the subsequent one of such intermittent movements, electrical means controlled by said tolerance detecting means for retaining such package on said article handler if the weight of such package is less than the minimum range of tolerance established, and for signalling the weighing of such package if its weight is more than the maximum range of tolerance established, a reject chute, said package handler moving such under-weight package retained thereon to said reject chute during the next one of such intermittent movements, a jam detector, including a timer device, having an actuator in said reject chute for stopping the operation of said package handler when said chute is blocked, the successive package being individually handled, signalled if over-weight and retained and rejected if under-weight, entirely independently of the preceding package.

2. In a device of the class described, in combination, an article conveyor, a single weighing scale, article handling apparatus comprising a stationary horizontal circular table, intermittent motion mechanism, a horizontally rotatable tray for moving articles individually over said table, said table having a position of ingress and egress for said article conveyor, a position in which said scale is located and an opening, a reject chute beneath said opening, said tray being rotated by said intermittent motion mechanism to move an article from said conveyor to said scale, and from said scale to said conveyor in successive intermittent movements, range of tolerance establishing means associated with said scale, means for closing said egress position of said conveyor for retaining articles on said table, electrical means conditioned by said tolerance establishing means to operate said retaining means upon the weighing of an article falling without such range of tolerance, said tray then moving such out-of-tolerance article away from said egress position of said article conveyor and to said opening in said table, means mounted in said egress position for stopping said device when egress of packages therefrom is blocked and means mounted in said chute for stopping said device when said chute is blocked.

MARK A. WECKERLY.